Nov. 11, 1952     L. A. CAMEROTA     2,617,498
ELEVATOR Filed Sept. 19, 1947                                                                10 Sheets—Sheet 1

FIG. 1

WITNESSES

INVENTOR:
Louis A. Camerota,
BY Paul & Paul
ATTORNEYS.

Nov. 11, 1952   L. A. CAMEROTA   2,617,498
ELEVATOR

Filed Sept. 19, 1947   10 Sheets-Sheet 4

FIG_5_

FIG_6_

WITNESSES
Thomas W. Kerr Jr.
A. J. Brittingham

INVENTOR:
Louis A. Camerota,
BY Paul & Paul
ATTORNEYS.

Nov. 11, 1952     L. A. CAMEROTA     2,617,498
ELEVATOR Filed Sept. 19, 1947     10 Sheets—Sheet 5

FIG_7.

FIG_8_

WITNESSES
Thomas W. Kerr, Jr.
A. J. Brittingham

INVENTOR:
Louis A. Camerota,
BY Paul r Paul
ATTORNEYS.

Nov. 11, 1952     L. A. CAMEROTA     2,617,498
ELEVATOR Filed Sept. 19, 1947     10 Sheets-Sheet 6

FIG_9_

FIG_10_

INVENTOR:
Louis A. Camerota,

Nov. 11, 1952

L. A. CAMEROTA 2,617,498

ELEVATOR

Filed Sept. 19, 1947

Elevator at Rest

WITNESSES

INVENTOR:
Louis A. Camerota,
BY
ATTORNEYS.

Patented Nov. 11, 1952

2,617,498

UNITED STATES PATENT OFFICE 2,617,498

ELEVATOR

Louis A. Camerota, Burlington, N. J., assignor to Florence Pipe Foundry & Machine Company, Florence, N. J., a corporation of New Jersey Application September 19, 1947, Serial No. 774,986

8 Claims. (Cl. 187—29)

This invention relates to elevators. More specifically, it has reference to elevator structures useful, for example, in loading and unloading multi-platen presses, such as the one disclosed in U. S. Patent 2,420,813 granted to me on May 27, 1947, designed for operation upon large and heavy sheets or slabs of plastic or other compressible materials.

My present invention has for its chief aim to facilitate loading and unloading of presses of the kind referred to, with a view toward reducing the idle periods of such presses to a minimum and thereby securing a correspondingly greater output from them.

This objective is attained as hereinafter more fully disclosed, through provision of improved means for raising and lowering the elevator carriage at relatively high speeds; and improved means for controlling the movements of the carriage so that it can be quickly stopped at any desired level without attendant jar such as would be likely to result in injury to the sheets or slabs supported therein.

Other objects and attendant advantages will appear from the following detailed description of the attached drawings, wherein.

Figure 1:
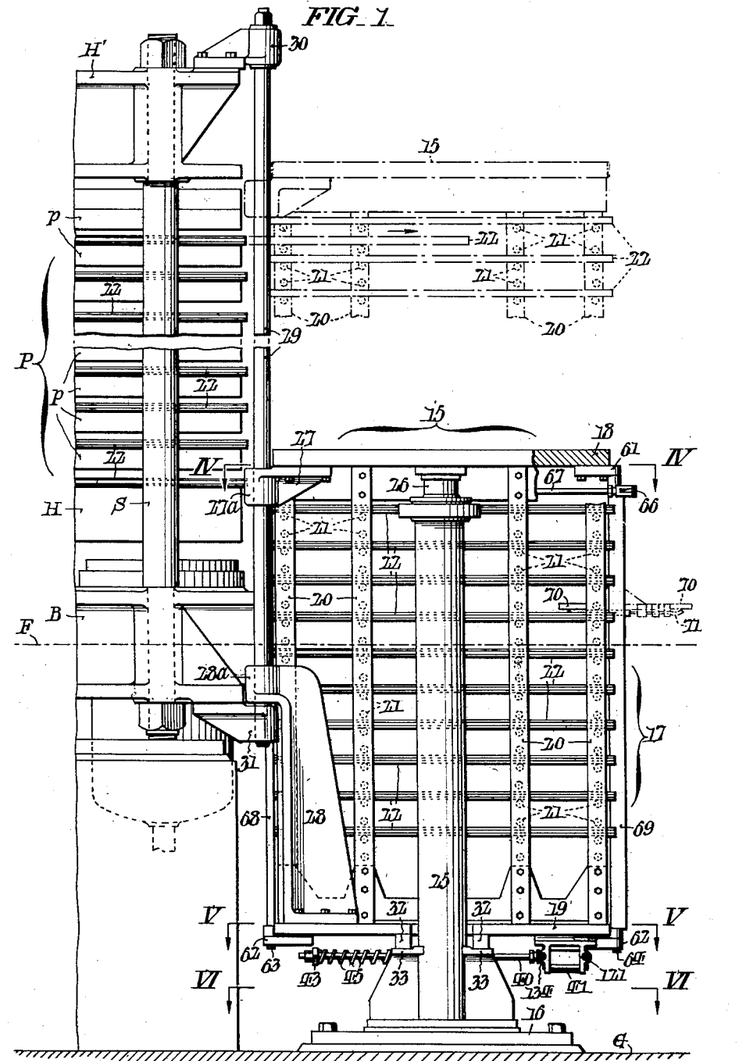
Fig. 1 is a view in side elevation of my improved elevator structure in association with a multi-platen press which is to be served thereby.
Figure 2:
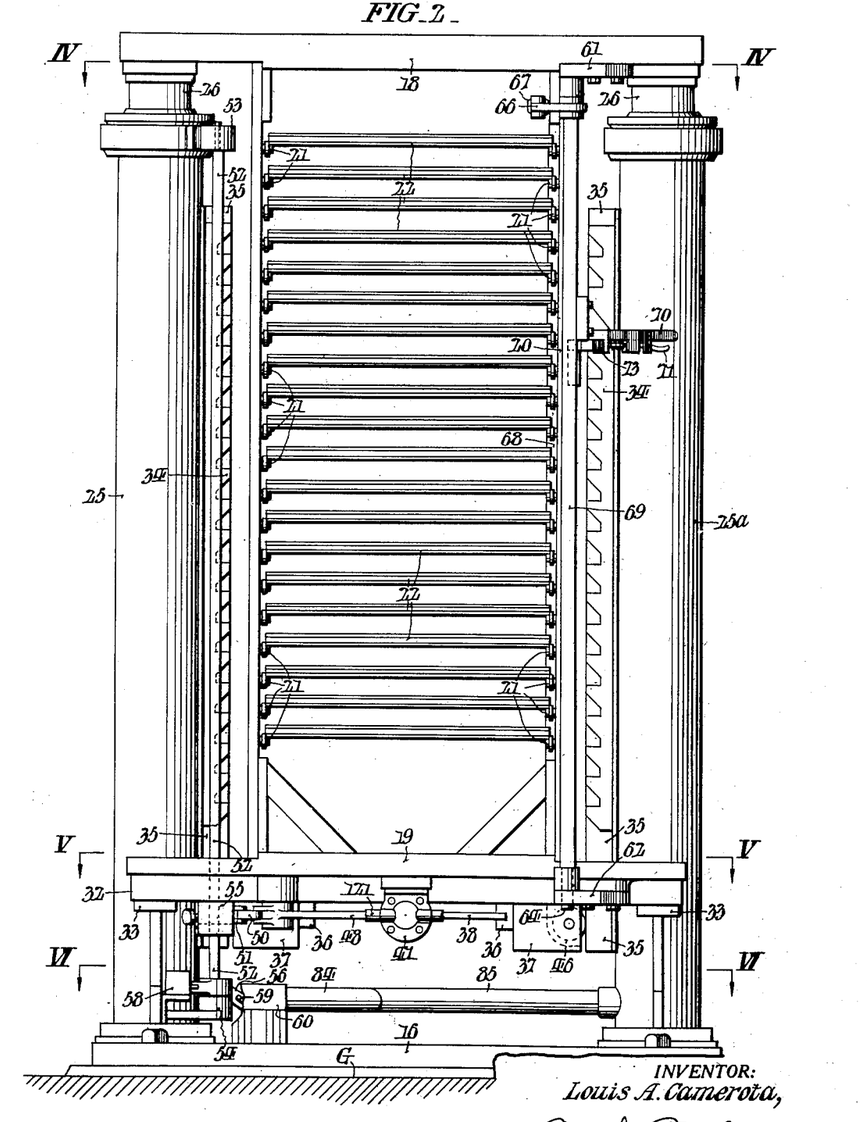
Fig. 2 is a view showing the elevator in front elevation, drawn to a larger scale.

Referring first more particularly to Figs. 1 and 2 of these illustrations, my improved elevator structure is comprehensively designated by the numeral 15 and shown as disposed alongside of the hydraulic press P which is to be served. The platens p of press P are arranged, one above another, between a vertically movable head H and a fixed abutment head H' at the top of the press supported by columns S upstanding from the base frame B of the press. The horizontal line F in Fig. 1 indicates the level of a floor on which the press attendant stands, said floor being raised above the ground or foundation level G for the base 16 of the elevator structure 15. By suitable means, not illustrated, the platens p are sustained in uniformly spaced relation when the press is open as shown, for loading and unloading.

The movable component of the elevator structure is in the form of a cage-like carriage 17 with a top or roof 18, and with a floor 19 connected by uprights 20 arranged in spaced relation along opposite sides of the carriage. Attached to inner sides of the uprights 20 at levels equally spaced by a distance equal to one-half that by which the platens p of the press P are separated when the press is open, are groups of horizontally-arranged rollers 21 for supporting the plastic sheets or slabs 22 along opposite side edges. The means for raising and lowering the carriage 17 includes a pair of upright hydraulic cylinders 25, 25a which are supported on the base 16 at opposite sides, and whereof the pistons 26 are connected to the roof plate 18. Affixed to the roof and the floor 18 and 19 of the carriage are brackets 27 and 28 with sleeve bosses 27a, 28a which slidably engage vertical guide rods 29 whereof the upper and lower ends are anchored in brackets 30 and 31 fastened to the head H' and the base frame B of the press P. By this means, the carriage 17 is confined to true vertical travel with assurance against binding of the pistons 26 in the cylinders 25 and 25a. When the carriage 17 is fully lowered, transverse bars 32 attached to the under face of its floor 19 rest upon stop projections 33 on the cylinders 25.

Arranged to cooperate with toothed rack strips 34 on vertical track bars 35 affixed to the cylinders 25, 25a are latch bolts 36 which are slidable endwise in blocks 37 at the under side of the carriage floor 19, and which, through toggle links 38, are connected to a head 39 on the piston rod 40 of an air cylinder 41 likewise secured to said floor. The piston rod 40 passes through a guide 42 and, at its distal end, is provided with a collar 43 between which and said guide, said rod is surrounded by a helical compression spring 45. By its action upon the piston rod 40, the spring 45 tends to keep the latch bolts 36 releasably engaged with the rack strips 34 whereof the teeth are vertically spaced by the same distance as the plate or slab supporting rollers 21 on the uprights 20 of the carriage, i. e., by a distance equal to one-half of the spacing of the press platens $p$ when the press is open. Journalled in the blocks 37 are rollers 46 which run against the flat inner faces of the track bars 35 and thus assist in steadying the carriage 17 in its up and down travel.

Medially fulcrumed at 47 on the under side of the floor of the carriage 17 is a horizontal lever 48 of which the long end is forked to engage between a pair of collars 49 on the air cylinder piston rod 40. The other or short end of the lever 48 is coupled, by means of a link 50, with an arm 51 which is slidable up and down on a shaft 52 of a square section whereof the top and bottom ends are cylindric and journalled respectively in fixed bearings 53 and 54 on the cylinder 25 and on the base of the latter. As shown, the fulcrum boss or hub of the arm 51 is engaged between the under face of the carriage floor 19 and a retaining plate bracket 55 spaced from, but bolted to the latter, so as to be obliged to travel up and down with the carriage. To the shaft 52 is fixedly secured, immediately above its lower bearing 54, a trip lever 56 whereof one end is operatively connected to the movable contact arm 57 of a limit switch 58, and whereof the other end is engaged by the plunger 59 of a control valve 60 for governing the up speed of the carriage 17, said valve being supported on the base of the elevator structure. This limit switch and this valve will again be referred to later.

Figure 3:
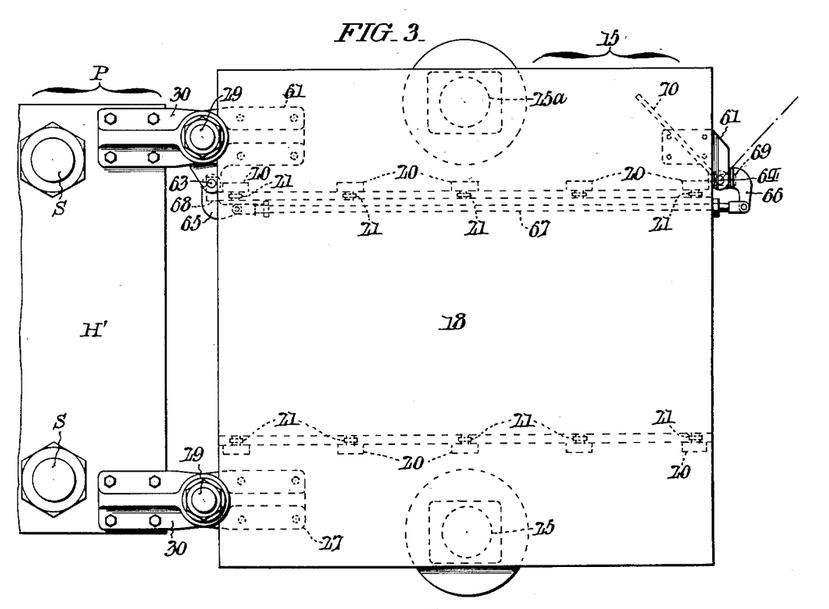
Fig. 3 shows the complete organization in top plan.
Figure 4:
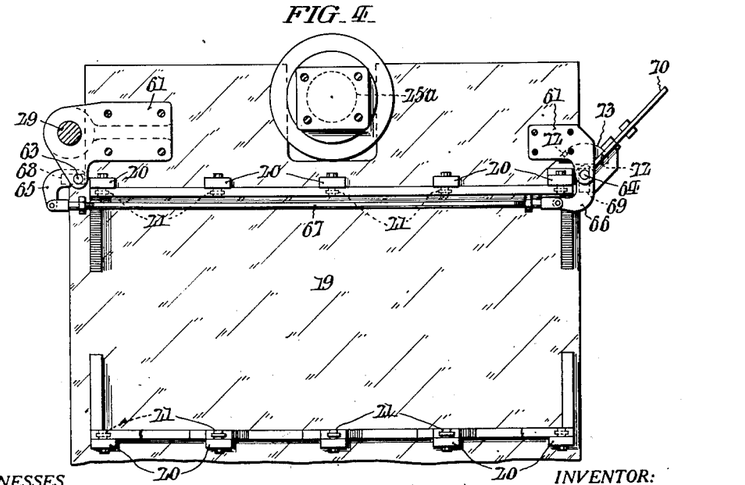
Figs. 4 and 5, 6 are horizontal sections taken as indicated respectively by the angled arrows IV—IV, V—V and VI—VI in Figs. 1 and 2.
Figure 5:
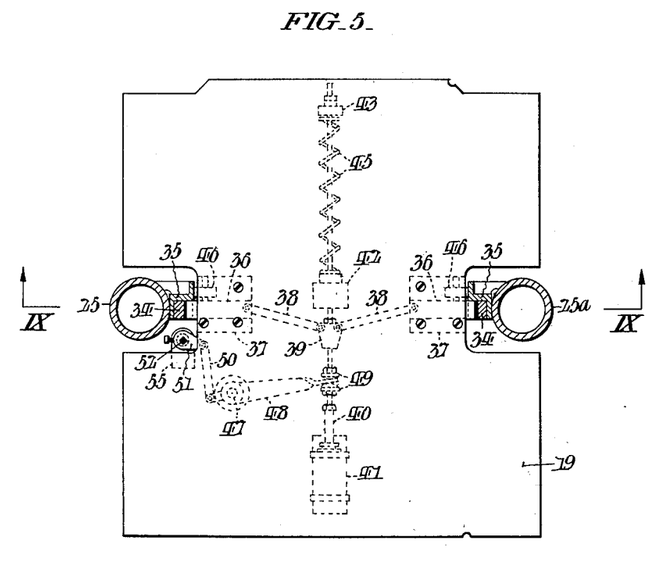
Figure 6:
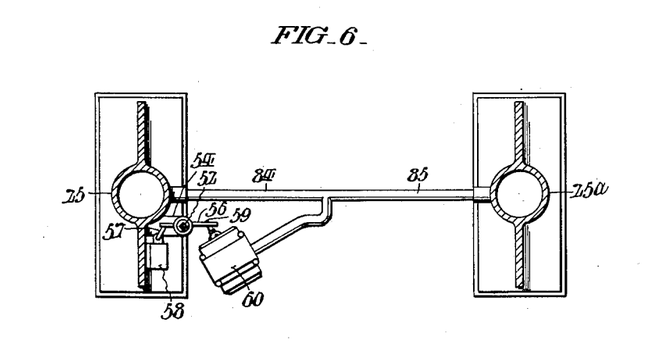
Figure 7:
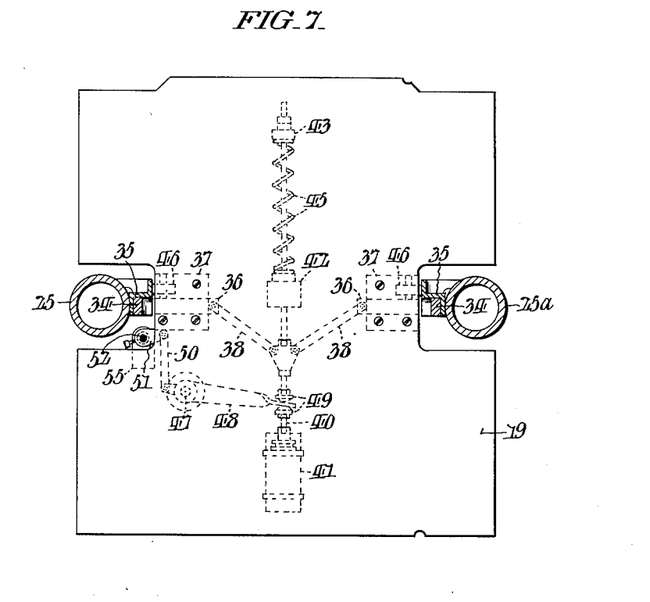
Figs. 7 and 8 are views like Figs. 5 and 6 with movable parts differently positioned.
Figure 8:
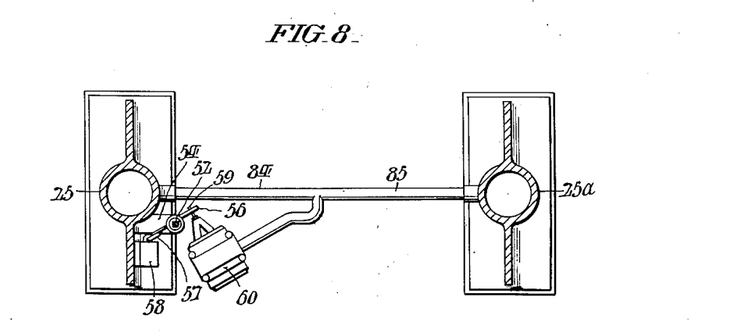
Figure 9:
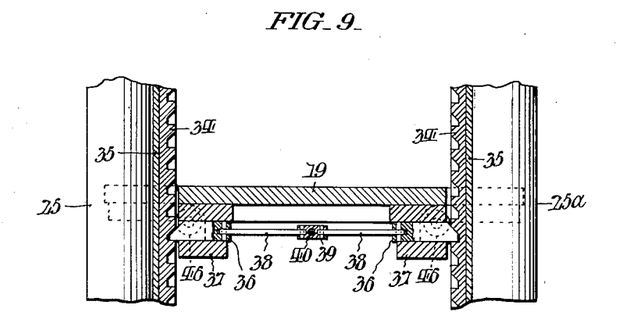
Fig. 9 is a fragmentary view in vertical section taken as indicated by the angled arrows IX—IX in Fig. 5.
Figure 10:
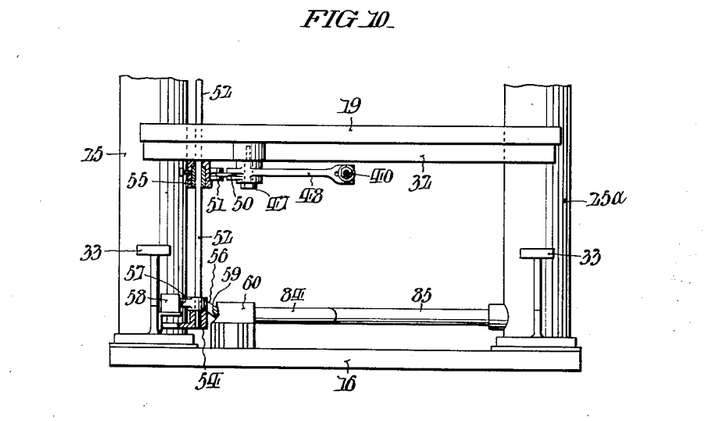
Fig. 10 is a fragmentary view showing the lower portion of the elevator structure in end elevation with certain parts broken out and shown in section for clarification of important structural details.

Journalled top and bottom in bearing brackets 61 and 62 on the carriage roof 18 and floor 19 are vertical shafts 63 and 64 whereto are secured angular arms 65 and 66 which are connected immediately below the roof by a transverse link bar 67, and which have stop wings 68 and 69 projecting radially from them respectively substantially throughout the height of the carriage. During loading of the carriage, the parts just described occupy the positions shown in Fig. 3, with the wing 68 on the shaft 63 retracted out of the way, and with the wing 69 on the shaft 64 projecting inward to stop the unpressed slabs as they are slid inward over the supporting rollers 21 at different levels. During unloading of the press, the shafts 63 and 64 are turned to position the wings 68 and 69 as shown in Fig. 4, i. e., with the wing 68 retracted out of the way and with the wing 69 projected inward to stop the pressed slabs as they are slid back into the carriage. The stop mechanism just described is operable by a hand lever 70 which is secured to the shaft 64, and which can be locked in either of two extreme positions in opposite directions by a latch 71 thereon selectively engageable with notches 72 in a fixed segment bracket 73.

The hydraulic fluid (oil) employed to operate the carriage is drawn through a pipe 75 from a supply tank 76 (Fig. 11) by a pump 77 with a coupled electric driving motor 78. The pump 77 delivers the oil by way of piping 79, 80, 81, 82, 83, 84, 85 to the bottoms of the cylinders 25, 25a. Interposed in this piping is a pressure relief valve 86, a check valve 87, and the speed control valve 60 previously mentioned. As shown, the pressure relief valve 86 has a vertically-movable downwardly spring-loaded piston element 88 whereof the conical lower end cooperates with a seat in the bottom of the valve casing. The piston element 88 has an axial bore 89 for pressure equalization, and a by-pass duct 90 for relief of the pressure from above said element by way of a duct 91 in the valve casing, relief through the latter duct being governed by a regulatable spring biased ball 92 which closes against a seat in said casing. Flow through the check valve 87 is normally prevented by a spring-loaded closure element indicated at 93; and the bleed of oil from pressure relief valve 86 is conducted to the reservoir 76 through a drain pipe 94. The up speed control valve 60 has a large main port 95 between upper and lower chambers 96 and 97 within its casing, said port being normally closed by a head on the plunger 59 which is subject to the upward pressure of a spring 59'. The up speed control valve 60 moreover has smaller auxiliary ports 98 and 99, whereof the former is normally closed by a downwardly spring loaded check 100, and the flow through the latter is regulatable by a needle element 101. Extending from the pipe branch 81 beyond the check valve 87, is an oil return pipe line 102, 103, 104 and 105 which discharges into the top of the reservoir 76; and interposed in this return line is a two way drain valve 106, an adjustable down speed needle valve 107, and a restraining valve 108. The drain valve 106 has a plunger 109 which is confined to endwise movement in the horizontal axial bore 110 of the valve casing, and which is provided with two heads for governing flow through ports 111 and 112 respectively. By means of a lever 115, the plunger 109 is operatively connected to the armature 116 of a solenoid 117 which will be again referred to later. As shown, the armature 116 is normally held withdrawn from the solenoid coil by means of a spring with the heads of the plunger 109 positioned to permit flow of the oil through the return pipe line by way of the ports 111 and 112. The closure element 118 of the restraining valve 108 is urged toward closed position in which it is shown in Fig. 11 by a spring 119.

Figure 11:
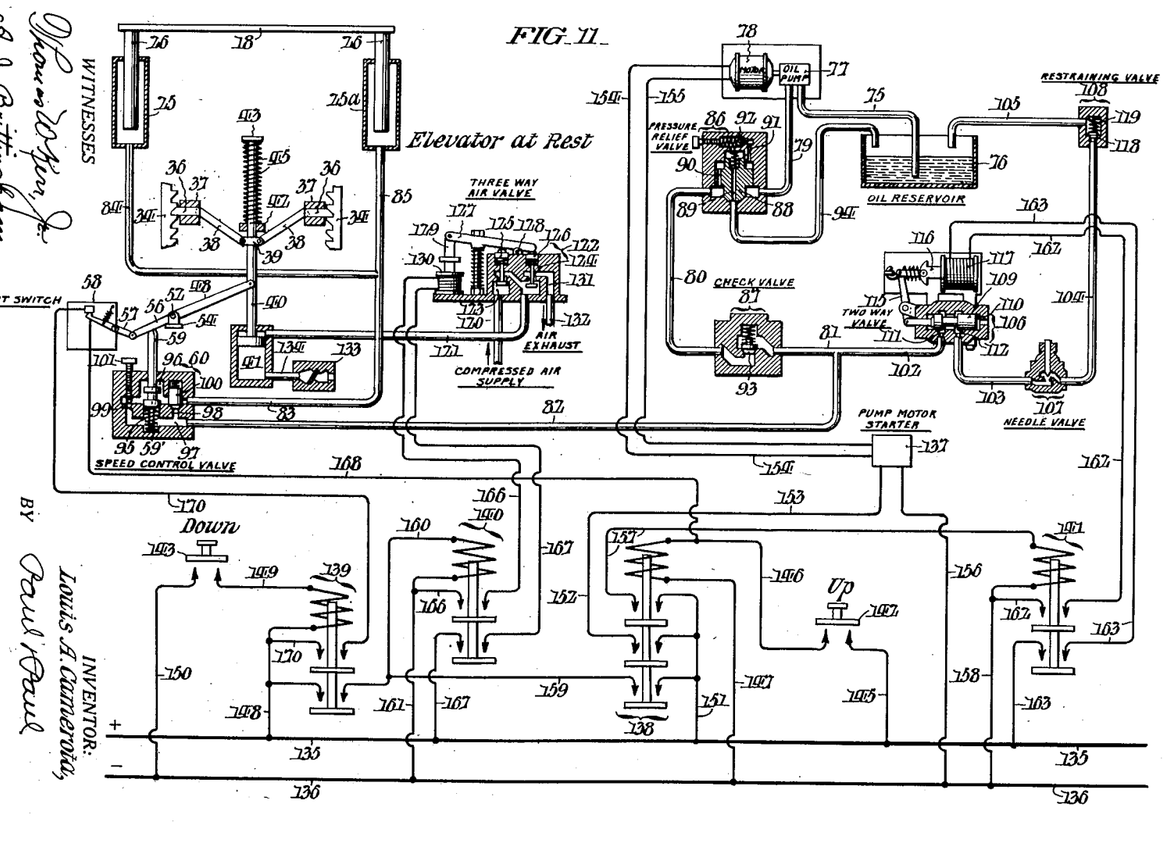
Fig. 11 is a diagrammatic view showing the various mechanical and electrical appurtenances embodied in the means by which the elevator car or carriage is operated and controlled, in the positions which they normally occupy when the carriage is at rest.

Compressed air for operating the latch actuating cylinder 41 is supplied from a suitable source (not illustrated) through piping indicated at 120, 121 in Fig. 11, wherein is interposed a three way valve 122. At its interior the valve 122 has two communicating ports 123, 124 through which the flow of air is governed by the heads of vertical axis plungers 125 and 126 respectively both of which are spring loaded upwardly. These plungers 125 and 126 are arranged to be operated alternately by a lever 127 which is fulcrumed at 128 on the top of the valve casing and connected at one end to the armature 129 of a solenoid 130. A spring normally maintains the lever 127 in the position in which it is shown in Fig. 11, with the armature 129 retracted from within the solenoid coil, and with the port 123 closed and the port 124 open. Leading from the port 124 is a passage 131 within the casing of valve 122, to which passage on air exhaust pipe 132 is connected. For the purpose of relieving the suction in the air cylinder 41 as the piston is moved therein under the influence of spring 45, I rely upon a check valve 133 which is in communication with the bottom of said cylinder by way of a pipe 134. As shown, the closure element of the check valve 133 has a bleed hole to permit escape of air from the cylinder below the piston during forced downward movement of the latter.

Figure 12:
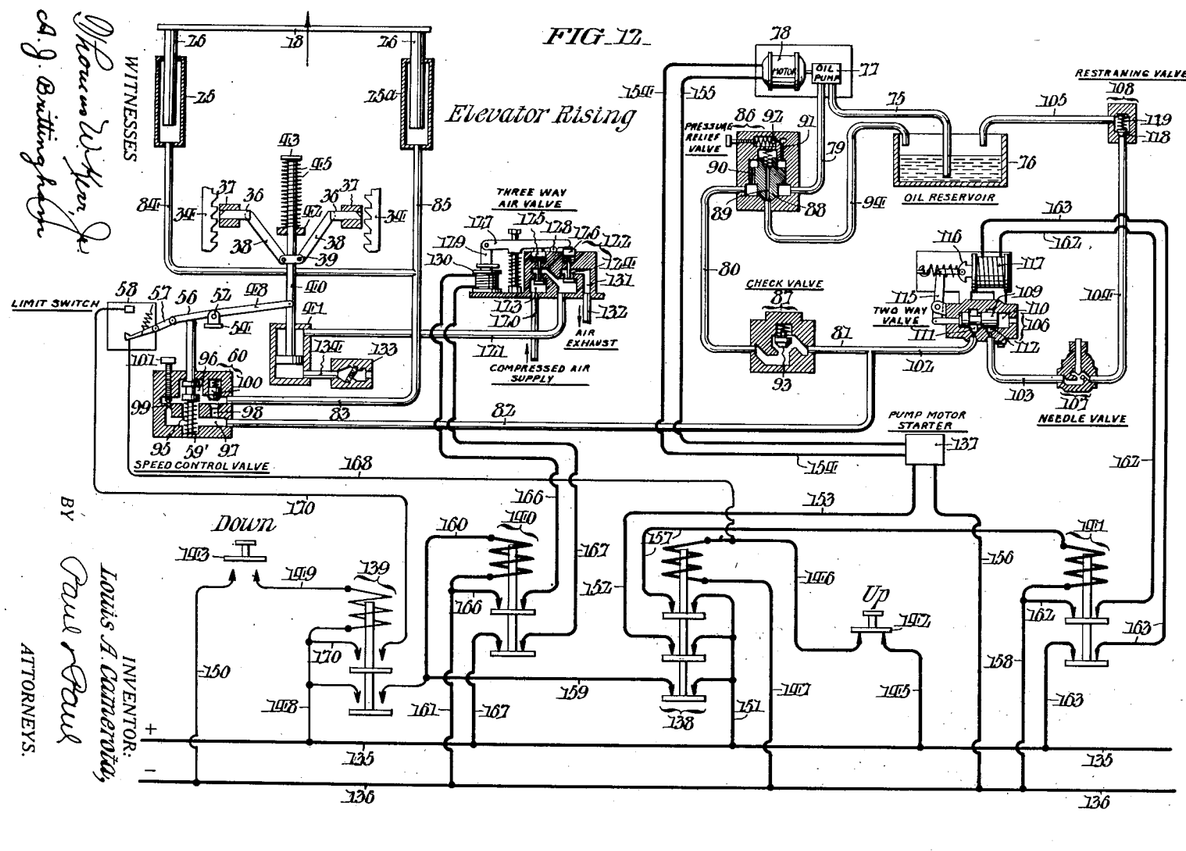
Figs. 12, 13 and 14 are views like Fig. 11 but showing the control parts in the positions which they assume during raising and lowering of the carriage.
Figure 13:
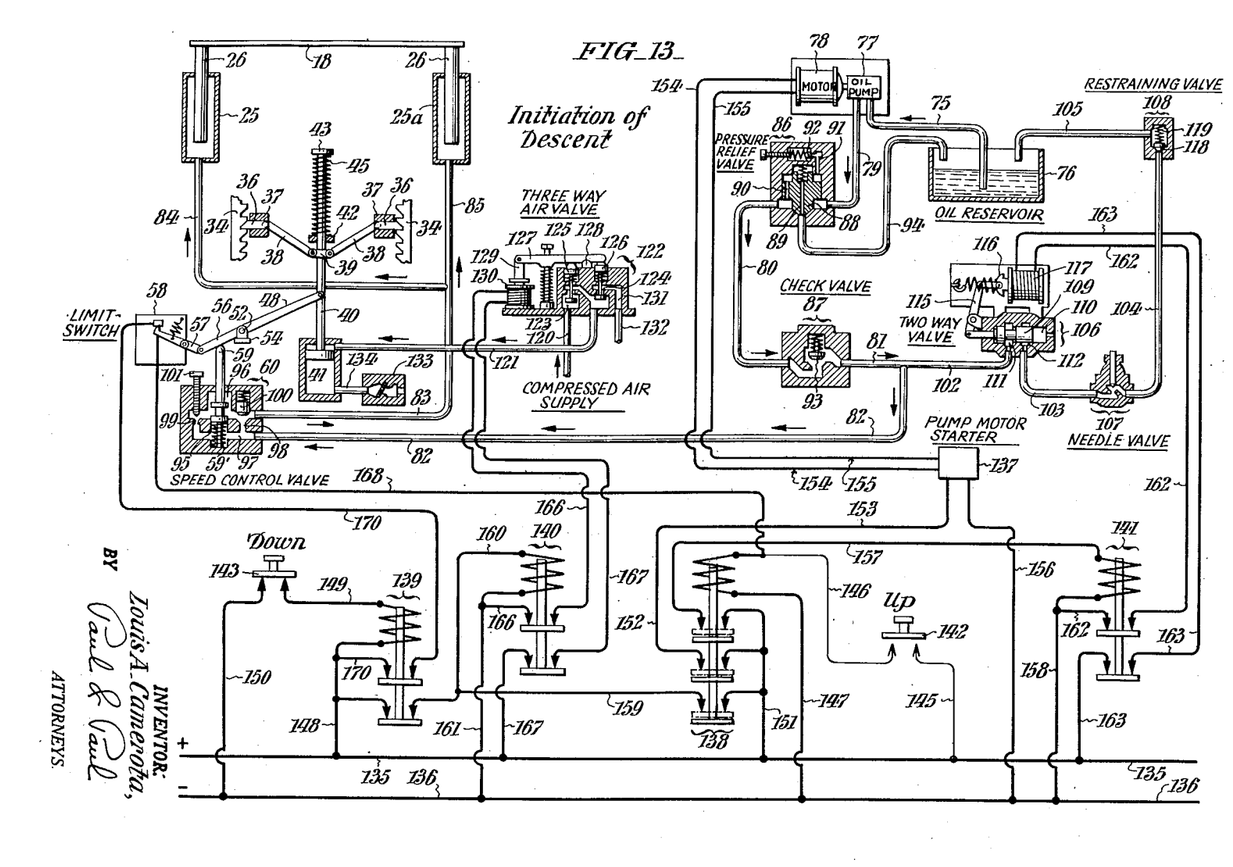

For the purpose of controlling the operation of the elevator carriage, I have further provided an electric control system for which current is supplied from power mains 135 and 136, see Figs. 11-13. Embodied in this system is a starter 137 for the oil pump motor 78, a three pole relay 138, three two pole relays 139, 140 and 141, and manual push button switches 142 and 143 for initiating the lift and drop cycles of the elevator carriage 17. Normally all the circuits involved in the system are dead as in Fig. 11, when the carriage 17 is at rest.

As shown, the coil of relay 138 is interposed in a circuit 145, 146, 147 with the "Up" push button 142, and the coil of relay 139 in a circuit 148, 149, 150 with the "Down" push button 143. The relay 138 is arranged to control a circuit 151, 152, 153, 154, 155 and 156 containing the pump motor 78 and its starter 137. Coil of relay 141 is disposed in a circuit 151, 157, 158, and the coil of relay 140 in a circuit 151, 159, 160, 161. Relay 141 is relied upon to control a circuit 153, 162, 163 containing the coil of the actuating solenoid 117 for the two way oil valve 107, and relay 140 to govern a circuit 161, 166—167 containing the actuating solenoid 130 for the three way valve 122. A conductor 168 connects the movable contact of the limit switch 58 with the conductor 146 which leads from the "Up" button 142 to the coil of relay 138; and a conductor 179 extends from the fixed contact of said switch to the relay 139.

The operation of the elevator is as follows:

When the carriage 17 is at rest, the conditions then prevailing are as illustrated in Fig. 11 as previously stated, that is to say: the latches 36 are projected and engaged with the toothed racks 34; the valves 60, 86, 87 and 106 are closed with the oil slack in the cylinders 25, 25a and the connecting piping; the air valve 122 set with the latch actuating cylinder 41 dormant and in communication with the atmosphere at the top; the limit switch 58 closed; and all of the electric circuits "dead" with the pump motor 78 dormant.

To raise the carriage 17, the operator pushes "Up" button 142 as in Fig. 12, with consequent establishment of current flow through the coil of relay 138 and closing of the contacts of the latter, whereby current flow is in turn established through the coils of relays 140 and 141 and the contacts of the latter are likewise closed. By excitation of relay 138, the starter 137 is actuated and the oil pump motor 78 set in motion, and the solenoid 117 energized by operation of relay 141 to close drain valve 106; while through actuation of relay 140, the coil of solenoid 130 is energized to close the outlet 124 of valve 122 and open the inlet thereof for admission of compressed air by way of pipe 121 into the latch actuating cylinder 41. The force of the compressed air is however insufficient to effect immediate retraction of the latches 36 due to the frictional restraint imposed upon the latter by the weight of the carriage 17, but under the influence of the pump 77, the oil pressure builds up so that oil is forced by way of the piping 79, 80, 81, 82, 83, 84 and 85 into the cylinders 25, 25a, the valves 86 and 87 and the check 100 of valve 60 opening automatically under the influence of the pressure as shown in Fig. 12. The oil thus introduced into the cylinders 25, 25a at this time is slight by reason of the smallness of the passage 98 of valve 60. In this way the carriage 17 is raised slowly at first to overcome its inertia and to permit retraction of the latches by the air cylinder 41. As the piston rod 40 of air cylinder 41 moves downward and actuates lever 48, the limit switch 58 is opened and the stem 59 of valve 60 freed to the influence of spring 59'. Actuation of limit switch 58 at this time serves no useful purpose; but through release and shifting of the stem 59, the main port 95 of valve 60 is opened and the check 110 unseated by the pump pressure so that the full volume of the oil thereby permitted to flow around the check 100 of said valve and into the cylinders 25, 25a as shown in Fig. 12 to now raise the carriage more rapidly, the latches being held retracted all the while by maintained energization of the solenoid of valve 122. The operator keeps the "Up" button 142 depressed until the rising carriage has reached the desired height, i. e., a level where the latches 36 will be slightly above the teeth of the racks 34 corresponding to that height, and then releases said button whereupon relays 140, 141 and 142 will immediately open. As a consequence, oil pump motor 78 is stopped and valves 87, 106, 122 are re-set to the normal condition in which they are shown in Fig. 11, with the result that oil and air flow respectively to cylinders 25, 25a, and 41 is interrupted, and exhaust from said cylinders permitted to take place. Spring 45 now acts upon the piston rod of air cylinder 41 and thereby causes latches 36 to be projected as the carriage begins to descend by gravity, the oil flowing from cylinders 25, 25a back to tank 76 by way of the piping 85, 84, 83, 82, 102, 103, 104 and 105 and the interposed valves 60, 106, 107 and 108, the rate of the drop being governed by regulatable bleed valve 107. As the carriage 17 settles, the latches 36 in moving outward follow the slopes of the notches immediately over the selected stop teeth of the racks 34, and during ensuing movement of the piston rod of air cylinder 41, the limit switch 58 is closed (again without serving any useful purpose) and the stem 59 of valve 60 at the same time shifted to closed position. The oil discharge from the cylinders 25, 25a, it will be observed, then takes place slowly around the now closed elements 100 and 96 of valve 60 and through the small regulatable port 99, with the result that the carriage eventually comes gently to rest without attendant jar. Since the elevator carriage comes to rest only at a rack step, the sheets supported on the rollers 21 at the different levels will always be centered with respect to the intervals between the press platens when the press is open. In Fig. 12, heavy lines have been used to show those circuits which are "live" during rising of the carriage.

Figure 14:
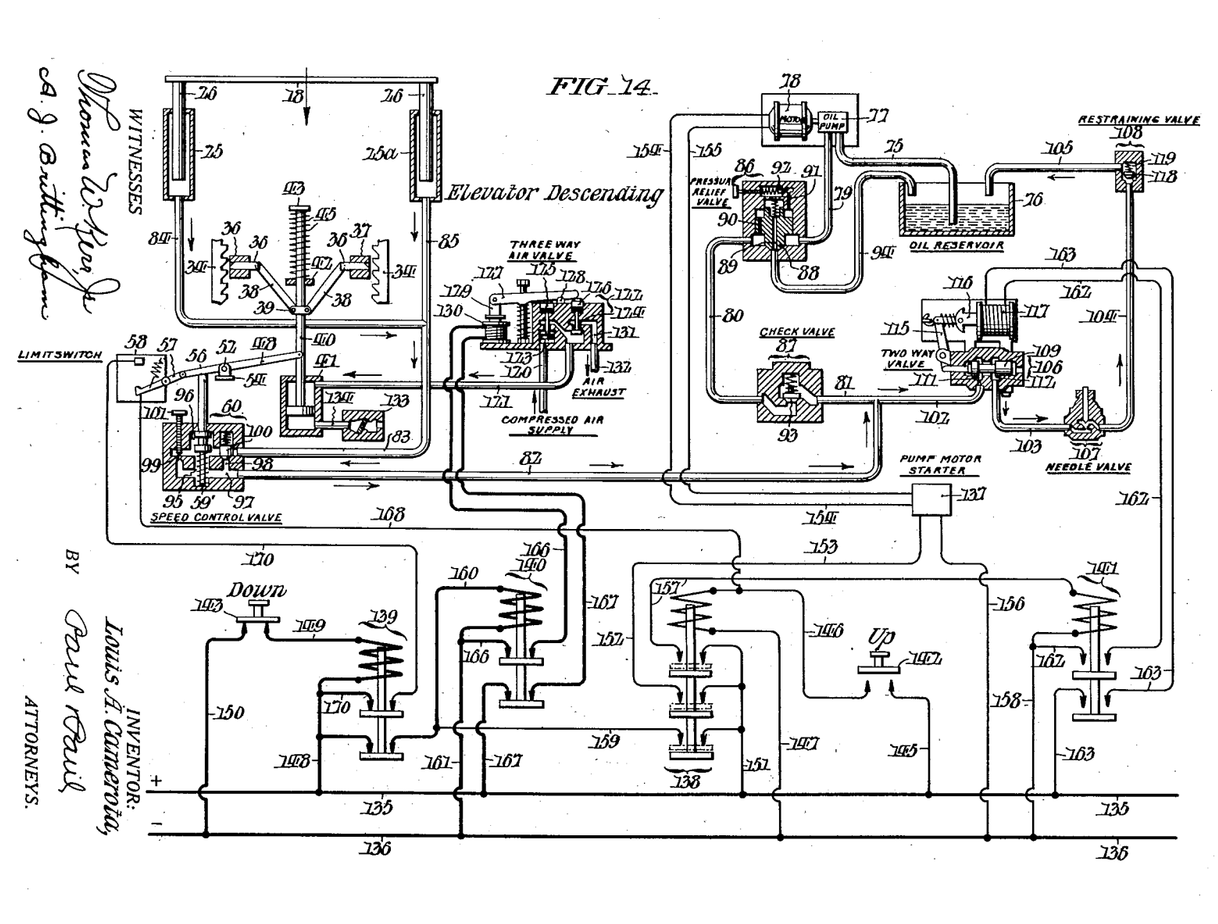

To drop the carriage 17 (with the apparatus in the condition shown in Fig. 11), the operator pushes the "Down" button 143 with the result that current flow is established through coil or relay 139 the contacts of said relay being thereby closed as in Fig. 13, to establish current flow through the coil of relay 140 of which the contacts are also closed as a consequence. Due to the operation of the relays 139 and 140 as just explained, the solenoid 130 is energized and the valve 122 thereby operated to permit flow of compressed air to the latch actuating cylinder 41 and to shut off exhaust from the latter. Current flow is at the same time set up through the coil of relay 138 by way of conductors 148, 170, 168 and 147 (the limit switch 58 being at this time still closed), whereby the latter relay is also closed as also shown in Fig. 13. In the same manner as described in connection with the raising of the carriage, functioning of the relay 138 brings about the actuation of relay 141. Accordingly, valve 106 is actuated with attendant opening of its port 111 and closing of its port 112, and the pump 77 set into operation to deliver oil under pressure through pipe 79, valve 86, pipe 80, valve 87, pipes 81, 82, port 87 of valve 60 (the check 100 of the latter opening in response to the pump pressure), and pipes 83, 84 and 85 to the elevating cylinders 25 and 25a. As the oil enters the cylinders 25, 25a, the elevator is raised slightly for easement of the latches 36 to permit their retraction by cylinder 41 to which air is being admitted through pipe 121 from valve 122. As piston rod 40 of cylinder 41 descends, limit switch 58 opens as in Fig. 14, the circuit through coil of relay 138 is broken with consequent breaking in turn of the circuit through coil of relay 141. Relays 138 and 141 being thus opened, current flow to the motor 78 is interrupted with attendant stopping of the oil pump 77, and the solenoid 117 is de-energized for opening of drain valve 106. Relay 140 however remains energized at this time so that the latches 36 are kept retracted through maintenance of current flow in the heavy lined portions of the wiring in Fig. 14. Upon stopping of pump 77, and consequently restoration of valve 106 to normal condition, the carriage 17 drops by gravity while the oil flows back into the tank 76 by way of pipes 84, 85 and 83, through valve 60, pipes 82 and 102, valve 106, pipe 103, valve 107, pipe 104, valve 108 and pipe 105, with the rate of descent governed by valve 107. When the elevator car has dropped to the desired extent, the "Down" button 143 is released slightly before the still retracted latches 36 reach the level of the corresponding stop teeth of the racks 34. Release of button 143 is attended by opening of the relay 139 and in turn of relay 140, whereby the air valve 122 is actuated to permit exhaust of air cylinder 41 and the oil valve 60 is closed. Thereafter, the oil discharges from the cylinders 25, 25a through the needle orifice 99 of valve 60 with consequent retardation in the rate of descent of the elevator carriage which comes gently to rest with the latches 36 bearing on the teeth of the racks 34 at the selected level. At the end of each down cycle of the carriage, the parts all reassume the normal rest positions in which they are shown in Fig. 11.

Having thus described my invention, I claim:

1. In an elevator structure of the character described, a carriage; a pressure fluid actuating cylinder for the carriage; a vertically-arranged toothed rack along the path of the carriage, a spring biased latch on the carriage adapted, by cooperation selectively with the rack teeth to support the carriage at different elevations; latch actuating means; selective means for controlling the latch actuating means to retract the latch and admission and exhaust of fluid pressure to and from the carriage actuating cylinder; and means automatically operative upon retraction of the latch during raising and lowering operations to restrict flow of pressure fluid to the carriage actuating cylinder for slow movement of the carriage to relieve the latch of the carriage weight at starting; and to permit increased flow of pressure fluid to the carriage actuating cylinder upon retraction of the latch for faster movement of the carriage thereafter; the last mentioned means including a valve with a port of small area, a spring biased check for said port which opens under pressure of the fluid, a larger main port normally obstructed by a closure element, and an operating connection between said closure element and the latch actuating means.

2. In an elevator structure of the character described, a carriage; a pressure fluid actuating cylinder for the carriage; a vertically-arranged toothed rack along the path of the carriage; a retractable latch on the carriage adapted, by cooperation selectivity with the rack teeth to support the carriage at different elevations; a pressure fluid actuating cylinder for the latch; selective control means operative to admit and exhaust pressure fluid to and from the two cylinders in raising and lowering the carriage; and speed control means automatically operated from the piston rod of the latch actuating cylinder upon retraction of the latch during raising and lowering operation to restrict flow of pressure fluid to the carriage-actuating cylinder for slow movement of the carriage until the latch is relieved of the carriage weight at starting; and permit increased flow of pressure fluid to the carriage-actuating cylinder for faster movement of the carriage thereafter, the last mentioned means comprising valve with a port of small area, a spring-biased check for said port which opens under pressure of the fluid, a larger main port normally obstructed by a closure element and a mechanical connection between said closure element and the piston rod of the latch actuating cylinder.

3. In an elevator strucutre of the character described, a carriage; a pressure fluid actuating cylinder for the carriage; an electro-magnet actuated valve for governing flow and exhaust of pressure fluid to and from said cylinder; a vertically-arranged toothed rack along the path of the carriage; a retractable latch on the carriage adapted, by cooperation with the rack, to support the carriage at different elevations; a pressure fluid actuating cylinder for the latch; an electro-magnet actuated valve for governing flow and exhaust of pressure fluid to and from the latch-actuating cylinder; an electric control circuit in which are interposed the coils of the electro-magnets of the two valves, separate manually-operable switches for use respectively in controlling energization of the electro-magnets for actuation of the respective valves and the governance thereby of the flow of the pressure fluid to and from the corresponding cylinders in raising and lowering of the carriage; a speed control valve for governing the rate of pressure fluid flow to and from the carriage-actuating cylinder respectively during rise of the carriage; and a mechanical connection whereby said valve is actuated from the piston rod of the latch-actuating cylinder to permit increased flow of the fluid to the carriage-actuating cylinder after the latch has been retracted at the initiation of each raising operation of the elevator.

4. In an elevator structure of the character described, a carriage; a pressure fluid actuating cylinder for the carriage; an electro-magnet actuated valve for governing flow and exhaust of pressure fluid to and from said cylinder; a vertically-arranged toothed rack along the path of the carriage; a retractable latch on the carriage adapted, by cooperation with the rack, to support the carriage at different elevations; a pressure fluid actuating cylinder for the latch; an electro-magnet actuated valve for governing flow and exhaust of pressure fluid to and from the latch-actuating cylinder; and an electric control circuit in which are interposed the coils of the electro-magnets of the two valves, separate manually-operable switches for use respectively in controlling energization of the electro-magnets for actuation of the respective valves and the governance thereby of the flow of the pressure fluid to and from the corresponding cylinders in raising and lowering of the elevator, and an automatically operated limit switch which is instrumental in causing actuation of the fluid flow governing valve for the carriage-actuating cylinder, to momentarily admit pressure fluid to the latter cylinder for easement of the latch of the carriage weight at the initiation of each lowering operation of the elevator.

5. In an elevator structure of the character described, a carriage; a pressure fluid actuating cylinder for the carriage; an electro-magnet actuated valve for governing flow and exhaust of pressure fluid to and from said cylinder; a vertically-arranged toothed rack along the path of the carriage; a retractable latch on the carriage adapted, by cooperation with the rack, to support the carriage at different elevations; a pressure fluid actuating cylinder for the latch; an electro-magnet actuated valve for governing flow and exhaust of pressure fluid to and from the latch-actuating cylinder; and an electric control circuit in which are interposed the coils of the electro-magnets of the two valves, separate manually-operable switches for use respectively in controlling energization of the electro-magnets for actuation of the respective valves and governance thereby of the flow of the pressure fluid to and from the corresponding cylinders in raising and lowering of the elevator, and a limit switch which is automatically operated through a mechanical connection with the piston rod of the latch-actuating cylinder and which is instrumental in causing actuation of the fluid flow governing valve for the carriage-actuating cylinder to momentarily admit pressure fluid to the latter cylinder for relief of the latch of the carriage weight at the initiation of each lowering operation of the elevator.

6. An elevator structure characterized as in claim 2, wherein the speed control valve has a regulatable bleed port to restrict drainage from the carriage-actuating cylinder after closing of the checks and main ports of said valve.

7. An elevator structure characterized as in claim 2, wherein a spring means tends to maintain the latch engaged with the rack; and wherein compressed air is employed for operating the latch actuating cylinder.

8. An elevator structure characterized as in claim 4, wherein the limit switch is normally closed and operable through a mechanical connection with the latch actuating means, and further including an electric motor driven pump; piping connecting the pump and the carriage actuating the cylinders and containing the first mentioned magnetic valve; and wiring through which current flow to the magnet of said valve and to the pump motor is controlled by the limit switch.

LOUIS A. CAMEROTA.

REFERENCES CITED

The following references are of record in the file of this patent:

UNITED STATES PATENTS

| Number | Name | Date |
|---|---|---|
| 232,433 | Baldwin | Sept. 21, 1880 |
| 488,838 | Rowland | Dec. 27, 1892 |
| 718,543 | Starks | Jan. 13, 1903 |
| 2,333,097 | Duboc et al. | Nov. 2, 1943 |
| 2,420,813 | Camerota | May 20, 1947 |